United States Patent [19]
> Ducas

[11] 4,020,350
[45] Apr. 26, 1977

[54] ISOTOPE SELECTIVE EXCITATION AND SEPARATION METHOD AND APPARATUS UTILIZING CIRCULARLY POLARIZED PULSED RADIATION

[75] Inventor: Theodore W. Ducas, Cambridge, Mass.

[73] Assignee: Massachusetts Institute of Technology, Cambridge, Mass.

[22] Filed: June 23, 1975

[21] Appl. No.: 589,168

[52] U.S. Cl. ............................. 250/423 P; 55/2; 204/157.1 R; 250/281
[51] Int. Cl.² ................. H01J 27/00; B01D 59/44; H01J 39/34
[58] Field of Search ............ B01J/1/00; 250/423 P, 250/284, 283, 282, 281; 55/2, 101; 204/DIG. 11, 157.1 R

[56] References Cited
UNITED STATES PATENTS 3,772,519  11/1973  Levy et al. ................. 250/423 P

FOREIGN PATENTS OR APPLICATIONS 2,312,194  10/1973  Germany ................. 250/423 P

*Primary Examiner*—Alfred E. Smith
*Assistant Examiner*—T. N. Grigsby
*Attorney, Agent, or Firm*—Arthur A. Smith, Jr.; Martin M. Santa; Robert Shaw

[57] ABSTRACT

The isotopes of a gas are separated by using a circularly polarized laser to excite a lower energy level to higher split intermediate energy levels, a second laser pulse of the same circular polarization is applied to said energized gas at a time $\pi/\Delta\omega$ where $\pi\Delta$ is the frequency splitting of the intermediate levels, to excite said excited intermediate levels to a higher energy level where an ionizing field ionizes the atoms or molecules in the higher level so that they may be separated from the un-ionized atoms or molecules of the other isotope.

12 Claims, 7 Drawing Figures

ISOTOPE SELECTIVE EXCITATION AND SEPARATION METHOD AND APPARATUS UTILIZING CIRCULARLY POLARIZED PULSED RADIATION

The invention herein described was made in the course of work performed under contracts with the Department of the Air Force, Office of Scientific Research, and the Department of the Army, Army Electronics command agencies of the United States Government.

This invention relates to apparatus and method of separation of different isotopes of the same element in a simple and efficient manner.

BACKGROUND OF THE INVENTION

The literature on previous attempts at isotope separation is quite extensive. The present methods in production center on the extremely costly and inefficient diffusion process. This process is only viable in very large scale installations.

Recently, a number of proposals for using lasers to separate isotopes have appeared. They include frequency selective excitation of one isotope-shifted transition. The excited species can then be swept out of the interaction region by chemical or ionization processes. These techniques require narrow-banded lasers, stabilized to distinguish in frequency between very closely spaced levels. These requirements often prevent very high powered or efficient systems required for production applications.

Another suggested method using lasers involves deflection of one isotope vs. another in an atomic or molecular beam using the momentum transfer from resonantly absorbed laser light. Again, these techniques require a very narrow-banded laser, good stability, and, in addition, an atomic beam apparatus which generally means a lower density of atoms, than, say, a gas cell.

It is an object of the invention herein described to provide apparatus and method for selective excitation of one particular isotope into a state where it can readily be swept out and collected, in particular by ionization. It is a process employing pulsed lasers where the primary requirement is to have reasonably short pulses — microsecond or nanosecond regime depending upon the atomic or molecular species involved same delay between pulses, and the same handedness of circular polarization. A comparatively gross timing and stability is all that is required of the lasers, far less stringent constrictions than for other laser techniques.

Typically, transition linewidths are tens to hundreds of MHz wide. ($3 \times 10^4$ MHz = 1cm$^{-1}$ in Energy) Isotope shifts of spectral lines are typically hundreds to about a thousand MHz. Thus the other techniques require lasers narrower than these isotope shifts and stabilized to wander at most one linewidth. In the present technique, typical laser linewidths and jitters of tens of thousands of MHz (and sometimes more) are allowable. This permits more powerful laser systems to be used. The laser technology exists and is well-developed. The method is quite efficient and especially adaptable to large scale production because of its simplicity. It must be emphasized again that this process can be applied to either atomic or molecular species — whichever is more efficient for the isotope to be separated.

Other objects, features and advantages of the invention will be apparent from the following detailed description of a preferred embodiments thereof taken in conjunction with the accompanying drawings in which:

BRIEF DESCRIPTION OF THE DRAWINGS

FIG. 1($b$) gives the same levels as in FIG. 1($a$) in the degenerate $(I,J,M_I,M_J)$ representation.

FIG. 2($b$) is a detailed drawing of the variable delay unit of FIG. 2($a$).

FIG. 2($c$) is a timing diagram showing the sequence of laser pulses and electric field pulse.

FIG. 3($b$) shows the same levels as in FIG. 3($a$) in the degenerate $(I,J,M_I,M_J)$ representation.

SUMMARY OF THE INVENTION

Figure 1A:
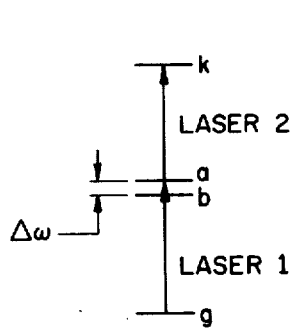
FIG. 1($a$) shows schematically a system of sublevels in the $(I,J,F,M_f)$ representation.

The central aspect of the invention is the successive excitation of the atoms or molecules by two pulsed lasers having the same sense or handedness of circular polarization. The first laser pulse creates a coherent superposition state in an intermediate level. The second laser pulse serves to excite selectively atoms or molecules prepared in this superposition state to a higher level. The critical conceptual aspect of this technique centers around the first step — creation of the coherent superposition state. Therefore, a detailed description of this step is useful.

FIG. 1($a$) shows schematically a particular system of sublevels in the $(I,J,F,M_f)$ representation. Levels $a$ and $b$ are split $\Delta\omega$ by the hyperfine interaction. Laser 1 of FIG. 2 excites a coherent superposition from level $g$ to levels $a$ and $b$; laser 2 causes transitions from this superposition to a higher level $k$.

Consider the first pulsed laser exciting an atomic or molecular level which has a frequency splitting $\Delta\omega$ (see FIG. 1($a$) ). For example, this splitting can be due to fine structure or hyperfine structure. The splitting could also be externally induced by electric or magnetic fields or other perturbations. If the laser pulse is short enough, $\Delta t < 2\pi/\Delta\omega$, each photon has Fourier frequency components over a frequency range larger than $\Delta\omega$ and it creates an excited state that is a coherent superposition of states $a$ and $b$. Optimally, the center frequency of the laser should be within $2\pi/\Delta t$ of the frequencies corresponding to the energy differences of the averge energy of $a$ and $b$. When this optical frequency is used, the Fourier power spectrum is centered about the frequency separation of the levels to be excited. The center frequency of the laser is not critical and it is apparent that photons centered about frequencies greater than $2\pi/\Delta t$ can still contribute to creating coherent superposition states of $a$ and $b$ because of the wide spectrum of a short pulse.

FIG. 1($b$) gives the same levels in the degenerate $(I,J,M_I,M_J)$ representation. Here $U_1, V_1,$ and $W_1$ have $M_J = -\frac{1}{2}$; $U_2, V_2,$ and $W_2$ have $M_J = +\frac{1}{2}$. The incoming photons are right-hand circularly polarized and thus each must cause $M_J$ to increase by one. Thus excitation of the uppermost state is only possible when the intermediate state has some "$V_1$-like" character.

At this point, a brief discussion of these different ways of representing the same quantum states may be useful in understanding the principle of operation of this invention. In the case of hyperfine structure, the total electron angular momentum $\vec{J}$, interacts with the nuclear spin, $\vec{I}$, and splits a particular energy level into several levels each characterized by a different magnitude of the total angular momentum $\vec{F} = \vec{I} + \vec{J}$. In the case of J=½, shown in FIG. 1(b), the quantum number corresponding to $\vec{F}$ can have the two values $F = I \pm ½$. The states are described by the principal quantum number $n$ and the quantum numbers I, J, F and $m_F$, where the latter corresponds to the projection of $\vec{F}$ onto a particular axis in space, $F_z$. However, the states can equally well be expressed in terms of $n$, I, J, $m_I$ and $m_J$. Here the last two are the quantum numbers of $I_z$ and $J_z$. These two different, but equivalent descriptions are possible because $\vec{F}$ is simply the vector sum of $\vec{I}$ and $\vec{J}$.

For the J=½ case, level $a$ corresponds to $F = I + ½$ and $b$ to $F = I - ½$, each with the same $m_F$. Levels $a$ and $b$ are linear combinations of levels $V_1$ and $V_2$, $V_1$ and $V_2$ have $m_J = +½$, $m_I = m_F - ½$ and $m_J = -½$, $m_I = m_F = ½$ respectively.

Similarly, the $g$ level of FIG. 1(a) is a lower level with $m'_F = m_F - 1$, and $g$ is a linear combination of degenerate levels $U_1$ and $U_2$. $U_1$ has $m_J = -½$, $m_I = m'_F - ½$ and $U_2$ has $m_J = +½$, $m_I = m'_F + ½$.

If the laser is right-hand circularly polarized, the only excitation between the lower level and the intermediate level occurs between $U_1$ and $V_2$.

Figure 1B:
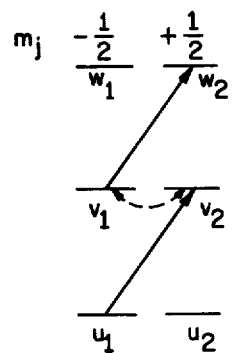

FIG. 1(b) shows that if we prepare the superposition states at $t=0$ with right-hand circularly polarized (rhcp) light, it is all "$V_2$-like" in character. This follows because absorption of rhcp light increases $m_J$ by 1 according to selection rules. As the state evolves freely in time, after the laser pulse has been terminated, $V_1$ component build ups by a transfer from level $V_2$ until it reaches a maximum at $t=\pi/\Delta\omega$. In fact, the amount of $V_1$ oscillates with a period of $Y = 2\pi/\Delta\omega$, exactly the characteristic period of the frequency splitting $\Delta\omega$. This is called "resonance oscillation".

A second laser pulse, also with rhcp and incident on the system at $t=\pi/\Delta\omega$ can excite atoms out of the superposition state into a high-lying level $k$.

The level $k$ of FIG. 1(a) is an upper level with $m_F'' = m'_F - 1$ and $k$ is a linear combination of degenerate levels $w_1$ and $w_2$. $w_1$ has an $m_J = -½$, $m_I = m''_F + ½$ and $w_2$ has $m_J = +½$, $m_I = m_F'' + ½$. If the laser is right-hand circularly polarized, the excitation occurs between the intermediate level $v_1$, and the upper level $w_2$. Atoms in this high-lying level can now be ionized easily (several hundred volts/cm electric fields), then swept out and collected efficiently by electric fields.

This laser excitation can take place in an atomic (or molecular) beam or a gas cell. The latter permits higher densities of atoms (or molecules). The only restriction on a cell are the destruction of high-lying states by collisions—this should only begin to be important at higher pressures than typical in atomic beams.

Figure 3A:
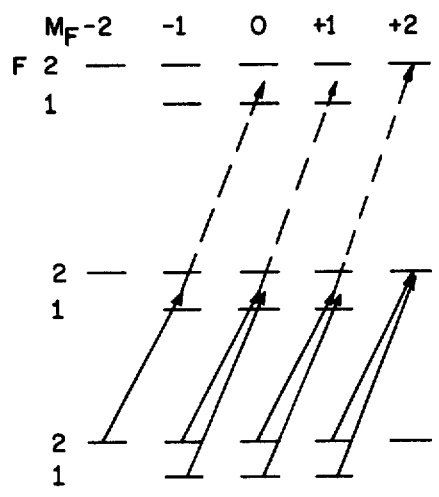
FIG. 3($a$) shows schematically a system of sublevels in the $(I,J,F,M_f)$ representation for relevant sodium energy levels.
Figure 3B:
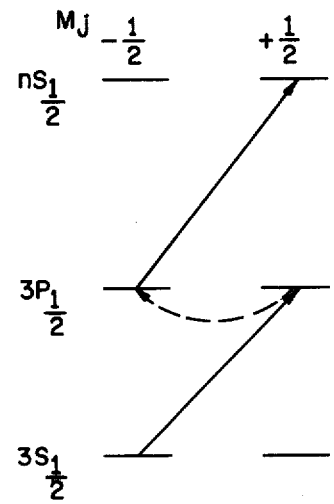

An example of this phenomenon is in exciting $Na^{23}$ ($I=3/2$). FIG. 3 shows the relevant sodium energy-levels in the F representation (FIG. 3(a)) and schematically in the degenerate representation (FIG. 3(B)). Theoretical understanding of this real case lies in realizing that it consists of several $g \rightarrow a,b, \rightarrow k$ sublevels systems as discussed above and as shown in FIG. 1. In the sodium case; $g$'s are sublevels of the $3s_{½}$ ground state; $a$ and $b$ are sublevels of the F = 2 and F = 1 levels of the $3p_{½}$ state respectively; $k$'s are sublevels of high-lying $ns_{½}$ levels. Since all levels involved have J = ½, each sublevel system in the degenerate representation looks similar to FIG. 3(b).

In the case of the $3p_{½}$ level of sodium, the frequency splitting between the F = 2 and F = 1 states is 200 MHz. This means that the laser pulses should be shorter than 5n sec. and the time between pulses, $t=\pi/\Delta\omega$, should be approximately 2½ n sec.

It must be emphasized that these examples where J = ½ for all levels are just simple cases of the isotope separation method. The method is valid for a wide variety of more complex level structures. In particular, for example, any atom or molecule with hyperfine splitting (any I and J) will exhibit similar resonance oscillation and be subject to selective excitation versus an isotopically different species.

It must be noted that in the above discussion both lasers could have been left-hand circularly polarized and the superposition state been all "$V_1$-like" at $t=0$. What is important is that both lasers have the *same* sense of circular polarization for maximum excitation of the upper-most level.

Typically atoms (or molecules containing such atoms) of odd atomic weight (as $U^{235}$) have hyperfine structure as discussed above. For the even isotope (say $U^{238}$) where there is no hyperfine structure, there is no resonance oscillation, hence the secod rhcp laser pulse is much less likely to excite to the high-lying level. In the J=½ case, a high-lying state is not populated at all for the even isotope. Thus by simply practicing this invention, the odd isotope can be excited and separated from the even isotope.

The resonance oscillation method has been described for the case of one isotope having structure while the other isotope doesn't. In fact, the method is more general and can be used to separate isotopes even if both have structure. In this latter case, the splitting of one isotope ($\Delta\omega_1$), is almost always different from that of another ($\Delta\omega_2$). Thus the time of application of the second laser pulse can be adjusted for maximum excitation of just one isotope. In particular, if isotope 1 is to be excited, the optimal time $t$ of application of the second laser pulse is $t = \pi/\Delta\omega_1$. Similarly, for optimal excitation of the second isotope, $t = \pi/\Delta\omega_2$. In these cases selectivity in excitation occurs because the optimal excitation time for one isotope differs from that of the other — and thus they are excited to the highest state with different probabilities.

In all these cases, the desired isotope can either be the one selectively excited and swept out by an ion collector or the one remaining in the interaction region.

PREFERRED EMBODIMENT OF THE INVENTION

Figure 2A:
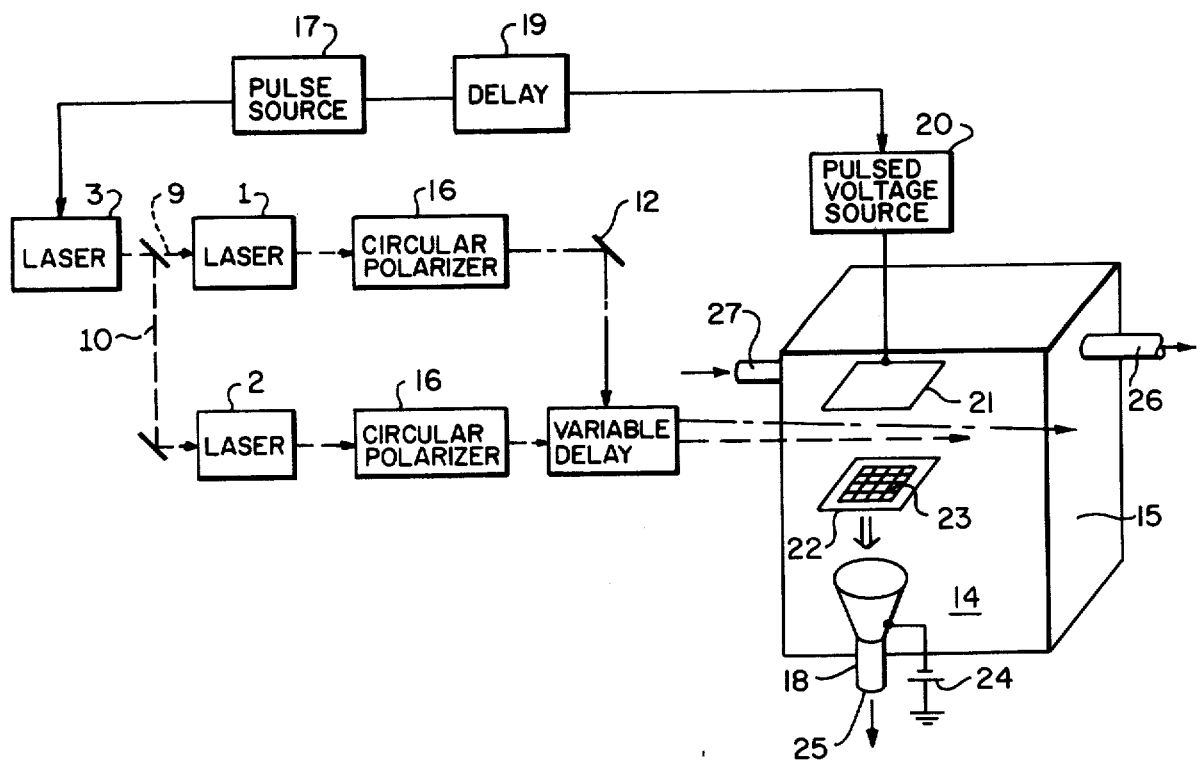
FIG. 2($a$) is a block design representation of a preferred embodiment of this invention.
Figure 2B:
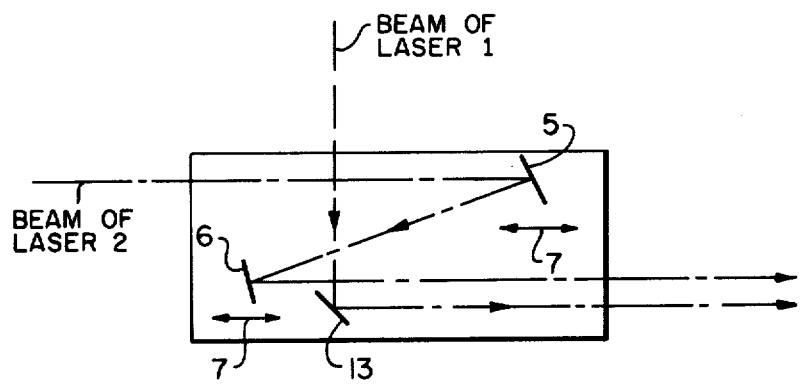

FIG. 2 illustrates a preferred embodiment of the invention. Lasers 1 and 2 are pumped by the same laser 3 — as for example two pulsed dye lasers 1, 2 pumped by the same pulsed nitrogen laser 3. The output of laser 3 is divided in beam splitter 8. One beam 9 pumps laser 1. The other beam 10 is reflected by mirror 11 before pumping laser 2. Laser 2 is delayed in a variable delay unit 4 with respect to laser 1 by bouncing off movable mirrors 5, 6 of variable separation as shown by direction arrows 7 in FIG. 2(b). Mirror 12 reflects the beam of laser 1 into variable delay unit 4 where it is merely redirected by mirror 13 to impinge upon the atoms or molecules 14 in chamber 15. The output of laser 1 and 2 are circularly polarized by polarizer 16. The polarizer 16 may be either right or left hand polarizers so long as both are the same.

The laser 3 is triggered in a conventional manner by a pulse source 17 which produces a continuous train of pulses. The pulses from source 17 are also provided to a delay unit 19 to provide a delay $t'$ which is greater than the delay $t = \pi/\Delta\omega$ of the pulse from laser 2. The delayed pulse triggers a pulsed voltage source 20 which provides an ionizing voltage +V between plates 21, 22. The space between these plates 21, 22 contains a gas which has been energized by lasers 1, 2. The ions are also given an acceleration toward plate 22 by the ionizing voltage so that they pass through the screen 23 which forms a major portion of plate 22. An ion collector 18 connected to a negative voltage source 24 collects the ion which pass through the screen 23 to provide substantially only one isotope at output 25 whereas the remainder of the gas exits at output 26. Enclosure 15 is provided with input gas at input 27.

Figure 2C:
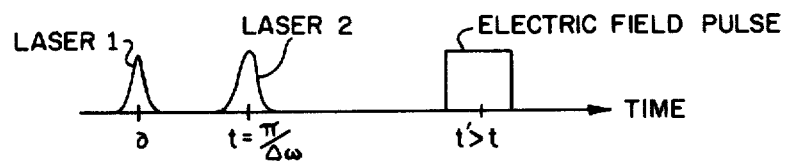

FIG. 2(c) shows the timing sequence of the laser pulses and the ionizing electric field pulse. The pulse duration of laser 1 at time $t=0$ is optimally considerably shorter than $2\pi/\Delta\omega$. The pulse duration of laser 1 at time $t=0$ is optimally considerably shorter than $2\pi/\Delta\omega$. This assures a high degree of coherence in the superposition state. The duration of laser pulse 2 is also optimally much shorter than $2\pi/\Delta\omega$. This allows maximum selectivity of excitation from the superposition state at time $t=\pi/\Delta\omega$. The ionizing electric field pulse preferably closely follows the pulse from laser 2 in order to minimize the period and hence allow a higher repetition rate.

Although in the preferred embodiment the ion creating electric field is a pulsed source which was energized after the second laser radiation was terminated, it is apparent that an alternate embodiment of the invention is one in which the electric field is continuously applied. A feature of this embodiment is that the ionization voltage produces a change in the frequency separation of the levels and causes additional energy levels. The perturbations in the energy levels of the gas because of the continuously applied ionizing field can be avoided if the pulsed ionizing field is applied after the second laser pulse since there are no perturbations in the absence of the ionizing field.

Although the second laser pulse has been described as being applied at a time $\pi/\Delta\omega$ after the first laser pulse, it will be apparent to those skilled in the art that since the amount of $V_1$ oscillates with a period of $Y = 2\pi/\Delta\omega$ that the second pulse could be applied at times $n\pi/\Delta\omega$ where $n = 1,3,5 \ldots$.

Although the invention has been described in an embodiment using two separate lasers it will be apparent to those skilled in the art that if the frequency corresponding to the difference of the first and second energy levels is close to that of difference of the second and third energy levels, the two lasers may be replaced by only one laser whose circularly polarized beam is split in a beam splitter to provide two beams corresponding to the beams from lasers 1 and 2. One beam, corresponding to that of laser 2, is delayed in variable delay unit 4 of FIG. 2. The apparatus otherwise is the same as that of FIG. 2.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

What is claimed is:

1. A method for selectively populating high-lying excited states of atoms or molecules comprising energizing said atoms or molecules with a first circularly polarized pulsed radiation, the coherent frequency components of said first pulsed radiation have frequencies corresponding to the energy difference between a lower energy level and the frequency split levels of an intermediate energy level, the duration of said pulse being less than $2\pi/\Delta\omega$, where $\Delta\omega$ is the frequency difference of the splt levels, applying a second circularly polarized pulsed radiation energization to said atoms or molecules for a time subsequent to the termination of said first radiation, the coherent frequency components of said second pulsed radiation have frequencies corresponding to the energy difference between the split levels of said intermediate energy level and an upper energy level, the duration of said second pulse being less than $2\pi/\Delta\omega$, the first and second radiation have the same handedness of circular polarization, whereby said upper energy level has a greater population than prior to energization by said first and second radiation pulses.

2. The method of claim 1 wherein said first radiation is produced by a laser and said second radiation is produced by the same laser, the second radiation traveling over a longer path than the first radiation to produce a time delayed second radiation.

3. The method of claim 1 wherein said first pulsed radiation is produced by one laser and said second pulsed radiation is produced by a second laser delayed in time.

4. A method for separating different isotopes of the same atom or molecules comprising energizing said atoms or molecules with a first circularly polarized pulsed radiation, the coherent frequency components of said first pulsed radiation have frequencies corresonding to the energy difference between a lower energy level and the frequency split levels of an intermediate energy level, the duration of said pulse being less than $2\pi/\Delta\omega$ where $\Delta\omega$ is the frequency difference of the split levels, applying a second circularly polarized pulsed radiation energization to said atoms or molecules for a time subsequent to the termination of said first radiation, the coherent frequency components of said second pulsed radiation have frequencies corresponding to the energy difference between the split levels of said intermediate energy level and an upper energy level, the duration of said second pulse being less than $2\pi/\Delta\omega$, the first and second radiation have the same handedness of circular polarization, applying an electric field to the energized atoms or molecules subsequent to the second radiation to ionize said high level atoms or molecules, separating said ionizing atoms or molecules of one isotope from the un-ionized atoms or molecules of the other isotope.

5. The method of claim 1 wherein the time at which the second radiation is applied is approximately $\pi/\Delta\omega$ seconds after said first laser radiation is applied.

6. The method of claim 1 wherein the duration of the first and second laser pulses and the time interval between them are those values which result in the largest population of the high energy level.

7. Apparatus for selectively populating high-lying excited states of atoms or molecules comprising means for energizing said atoms or molecules with a first circularly polarized pulsed radiation, the coherent frequency components of said first pulsed radiation have frequencies corresponding to the energy difference between a lower energy level and the frequency split levels of an intermediate energy level, the duration of said pulse being less than $2\pi/\Delta\omega$, where $\Delta\omega$ is the frequency difference of the split levels, means for applying circularly polarized pulsed radiation energization to said atoms or molecules for a time subsequent to the termination of said first radiation, the coherent frequency components of said second pulsed radiation have frequencies corresponding to the energy difference between the split levels of said intermediate energy level and an upper energy level, the duration of said second pulse being less than $2\pi/\Delta\omega$, the first and second radiation have the same handedness of circular polarization, whereby said upper energy level has a greater population than prior to energization by said first and second radiation pulses.

8. The apparatus of claim 7 wherein said first radiation energizing means is a laser and said second radiation energizing means is the same laser, the second radiation traveling over a longer path than the first radiation to produce a time delayed second radiation.

9. The apparatus of claim 7 wherein said first pulsed radiation energizing means is one laser and said second pulsed radiation energizing means is a second laser.

10. Apparatus for separating different isotopes of the same atom or molecule comprising means for energizing said atoms or molecules with a first circularly polarized pulsed radiation, the coherent frequency components of said first pulsed radiation have frequencies corresponding to the energy difference between a lower energy level and the frequency split levels of an intermediate energy level, the duration of said pulse being less than $2\pi/\Delta\omega$ where $\Delta\omega$ is the frequency difference of the split levels, means for applying a second circularly polarized pulsed radiation energization to said atoms or molecules for a time subsequent to the termination of said first radiation, the coherent frequency components of said second pulsed radiation have frequencies corresponding to the energy difference between the split levels of said intermediate energy level and an upper energy level, the duration of said second pulse being less than $2\pi/\Delta\omega$, the first and second radiation have the same handedness of circular polarization, means for applying an electric field to the energized atoms or molecules subsequent to the second radiation to ionize said high level atoms or molecules, means for separating said ionized atoms or molecules of one isotope from the un-ionized atoms or molecules of the other isotope.

11. The apparatus of claim 7 wherein the time at which the second radiation is applied is approximately $\pi/\Delta\omega$ seconds after said first laser radiation is applied.

12. The apparatus of claim 7 wherein the duration of the first and second laser pulses and the time interval between them are those values which result in the largest population of the high energy level.

* * * * *